United States Patent [19]
Aoki et al.

[11] Patent Number: 6,157,186
[45] Date of Patent: Dec. 5, 2000

[54] ROTATION DETECTING APPARATUS HAVING A CASING MADE OF RESIN MATERIAL AND HAVING A CLEARANCE GROOVE FOR ABSORBING THERMAL RADIATION

[75] Inventors: Yuhide Aoki; Hirotsugu Nakazawa, both of Gunma, Japan

[73] Assignee: Unisia Jecs Corporation, Atsugi, Japan

[21] Appl. No.: 09/096,188

[22] Filed: Jun. 12, 1998

[30] Foreign Application Priority Data

Jun. 26, 1997 [JP] Japan .................................. 9-185834

[51] Int. Cl.⁷ ................................................... G01P 3/48
[52] U.S. Cl. ................. 324/174; 324/207.25; 324/207.2; 324/207.12
[58] Field of Search ..................... 324/174, 167, 324/173, 207.15, 207.2, 207.21, 207.25, 207.12, 235, 251, 252; 307/116

[56] References Cited

U.S. PATENT DOCUMENTS

| | | | |
|---|---|---|---|
| 4,394,190 | 7/1983 | Ertl et al. | 29/622 |
| 4,443,275 | 4/1984 | Ertl et al. | 29/622 |
| 4,849,728 | 7/1989 | Goll et al. | 600/146 |
| 5,121,289 | 6/1992 | Gagliardi | 361/380 |
| 5,386,730 | 2/1995 | Ikeda et al. | 73/706 |
| 5,451,868 | 9/1995 | Lock | 324/173 |
| 5,572,120 | 11/1996 | Takaishi | 324/207.21 |
| 5,581,179 | 12/1996 | Engel et al. | 324/207.2 |
| 5,929,629 | 7/1999 | Hiraoka et al. | 324/174 |

FOREIGN PATENT DOCUMENTS

| | | |
|---|---|---|
| 282 967 | 9/1988 | European Pat. Off. . |
| 30 01 771 | 7/1981 | Germany . |
| 44 05 438 | 8/1995 | Germany . |
| 196 20 548 | 12/1996 | Germany . |
| 3-91969 | 9/1991 | Japan . |
| 2 107 882 | 5/1983 | United Kingdom . |
| 2 137 351 | 10/1984 | United Kingdom . |
| 2 226 640 | 7/1990 | United Kingdom . |
| 2 249 633 | 5/1992 | United Kingdom . |

OTHER PUBLICATIONS

Patents Abstracts of Japan, Ref. No. 60–82918, Rotation Detector, Sep. 10, 1985, vol. 9, No. 224.

*Primary Examiner*—Jay Patidar
*Assistant Examiner*—Subhash Zaveri
*Attorney, Agent, or Firm*—Foley & Lardner

[57] ABSTRACT

A rotation detecting apparatus comprises a casing body including a head portion, an installation bracket portion and a connector portion. A recess portion is formed at a side surface of the head portion. A magnet, a Hall-effect device and a circuit base plate are installed in the recess portion and are then covered with a sealing member. Further, a clearance groove is formed in the vicinity of a wall defining the recess portion. Therefore, the number of parts and the production cost of the apparatus are reduced, and the waterproof performance thereof is improved.

15 Claims, 4 Drawing Sheets

6,157,186

ROTATION DETECTING APPARATUS HAVING A CASING MADE OF RESIN MATERIAL AND HAVING A CLEARANCE GROOVE FOR ABSORBING THERMAL RADIATION

BACKGROUND OF THE INVENTION

The present invention relates to a rotation detecting apparatus suitable for detecting a rotation speed of an engine or electric motor.

Generally, it is well known that a type of a rotation detecting apparatus for detecting a rotation speed of an engine is generally an electromagnetic type comprising a magnet and a coil and of an optical type comprising a light emitting diode and a phototransistor. Japanese Utility Model Provisional Publication No. 3-91969 discloses an electromagnetic type rotation detecting apparatus where a Hall-effect device is used as a magnetic detecting element.

Herein, exemplifying a case that a conventional electromagnetic type rotation detecting apparatus 3 is used for detecting a rotation speed of an engine, the conventional rotation detecting apparatus will be explained on the basis of FIG. 4.

A rotation plate 1 functioning as a rotation member is formed into a disc with teeth from magnetic material. The rotation plate 1 is, for example, arranged to be fixed to a crankshaft (not shown) of an engine and to be rotated with the crankshaft in the direction indicated by the arrow A of FIG. 4. A plurality of tooth portions 2 are protruded from an outer peripheral portion of the rotation plate 1 into diametrical directions of the rotation plate 1. The tooth portions 2 are arranged at predetermined intervals in the circumferential direction. The electromagnetic type rotation detecting apparatus 3 comprises a casing 4 which is constituted by a cylindrical body 5, an installation bracket portion 6 and a L-shaped connector portion 7. The cylindrical body 5 has a bottom portion 5A. The installation bracket portion 6 is integrally formed with the cylindrical portion 5 so as to protrude from an upper end side of the cylindrical body 5 in the circumferential direction while providing an installation hole portion 6A. The L-shaped connector portion 7 is press-fitted with an opening portion of the cylindrical portion 5 to cover the opening portion. The casing 4 is formed into a L-shape from resin material. The installation bracket portion 6 is fixed to a frame of the engine by means of bolts and nuts (not shown) so as to locate the bottom portion 5A of the cylindrical member 5 in the vicinity of the rotation plate 1. An O-ring 8 is disposed between the installation bracket portion 6 and the connector portion 7. A magnet 9 is formed into a cylindrical shape, and a core member 10 is disposed in contact with an end portion of the magnet 9 in the axial direction. The core member 10 is made from magnetic material such as iron and ferrite, and is constituted by a large-diameter portion 10A in contact with and a small-diameter portion 10B formed at a tip end of the core member 10. A pair of Hall-effect devices 11A and 11B functioning as a magnetic detecting element are disposed at a tip end portion of the small-diameter portion 10B of the core member 10. The Hall-effect devices 11A and 11B detect a change of magnetic flux density between the magnet 9 and the rotation plate 1. A supporting plate 12 inserted into the cylindrical member 5 is formed into a generally U-shape. Disposed between a lower end of the supporting plate 12 and the bottom portion 5A of the cylindrical member 5 are the magnet 9, the core member 10 and the Hall-effect devices 11A and 11B. Both arms of the supporting portion 12 support both sides of a circuit base plate 13, respectively, so that the circuit base plate 13 is supported by the supporting plate 12 in the cylindrical member 5. A signal processing circuit 14 such as a waveform shaping circuit is constructed on the circuit base plate 13 by means of electronic parts. The Hall-effect devices 11A and 11B are connected to a terminal of the signal processing circuit 14, and the other terminal of the signal processing circuit 14 is connected to a lead wire 15 through which the signal processing circuit 14 is connected to an external microcomputer (not shown).

The operation of this conventional rotation detecting apparatus 3 will be discussed hereinafter.

First, the magnet 9 and the core member 10 produce magnetic field between the rotation detecting apparatus 3 and the rotation plate 1. At every times when each tooth portion 9 of the rotation plate 1 passes through the magnetic field according to the rotation of the rotation plate 1 in the direction indicated by the arrow A of FIG. 4, the magnetic flux density of the magnetic field is changed. The Hall-effect devices 11A and 11B detect the change of the magnetic flux density and output a detection signal based on the change to the signal processing circuit 14.

Next, the signal processing circuit 14 analog-to-digital converts the detection signal and output a pulse signal, in order to eliminate an excess component such as noises in the detection signal outputted from the Hall-effect devices 11A and 11B. The pulse signal is outputted to an external control unit. The external control unit executes the detection of the rotation speed of the engine from the pulse signal, and executes various controls such as a fuel injection control and a control of ignition timing of the engine.

However, since the conventional rotation detecting apparatus 3 is constituted by a casing 4, a magnet 9, a core member 10, a circuit base plate 14 and the supporting plate 12, it causes problems such that the number of the parts is increased, the assembly step is complicated and the production cost becomes high. Further, the casing 4 is constructed by two parts, that is, by the cylindrical member 5 and the connector portion 7, and the connector portion 7 is engaged with and fixed to the opening portion of the cylindrical member 5 while the O-ring 8 is installed therebetween. Furthermore, since the rotation detecting apparatus 3 is disposed in the vicinity of the engine, the casing 4 is thermally expanded due to the heat of the engine. By this thermal expansion, the cylindrical member 5 and the connector portion 7 generate thermal deformations, respectively. This causes a problem that the O-ring 8 installed therebetween can not prevent rain-water and muddy water from invading from outside to inside the apparatus 3.

SUMMARY OF THE INVENTION

It is an object of the present invention to provide a rotation detection apparatus which firmly prevents the invading of rain water and the like and performs high waterproof performance while decreasing the number of the parts, simplifying the total structure and improving the workability for assembling it.

The rotation detecting apparatus according to the present invention comprises a casing made of resin material, a magnet which is disposed in the casing and generates a magnetic field in company with the a rotation member, a magnetic detection element disposed in the casing while be located in the vicinity of the magnet and detecting the change of the magnetic field of the magnet changed by the rotation of the rotation member and a signal processing circuit for processing the signal from the magnetic detection element.

With this arrangement, the casing is formed by installing the magnet, the magnetic detection element and the signal processing circuit in the recess portion and by filling the recess portion with a sealing member. Therefore, the casing is formed into one-piece structure from the casing body and the sealing member. The magnet, the magnetic detection element and the signal processing circuit are embedded in therein.

BRIEF DESCRIPTION OF THE DRAWINGS

In the drawings, like reference numerals designate like parts and element throughout all figures, in which.

DETAILED DESCRIPTION OF THE INVENTION

Figure 1:
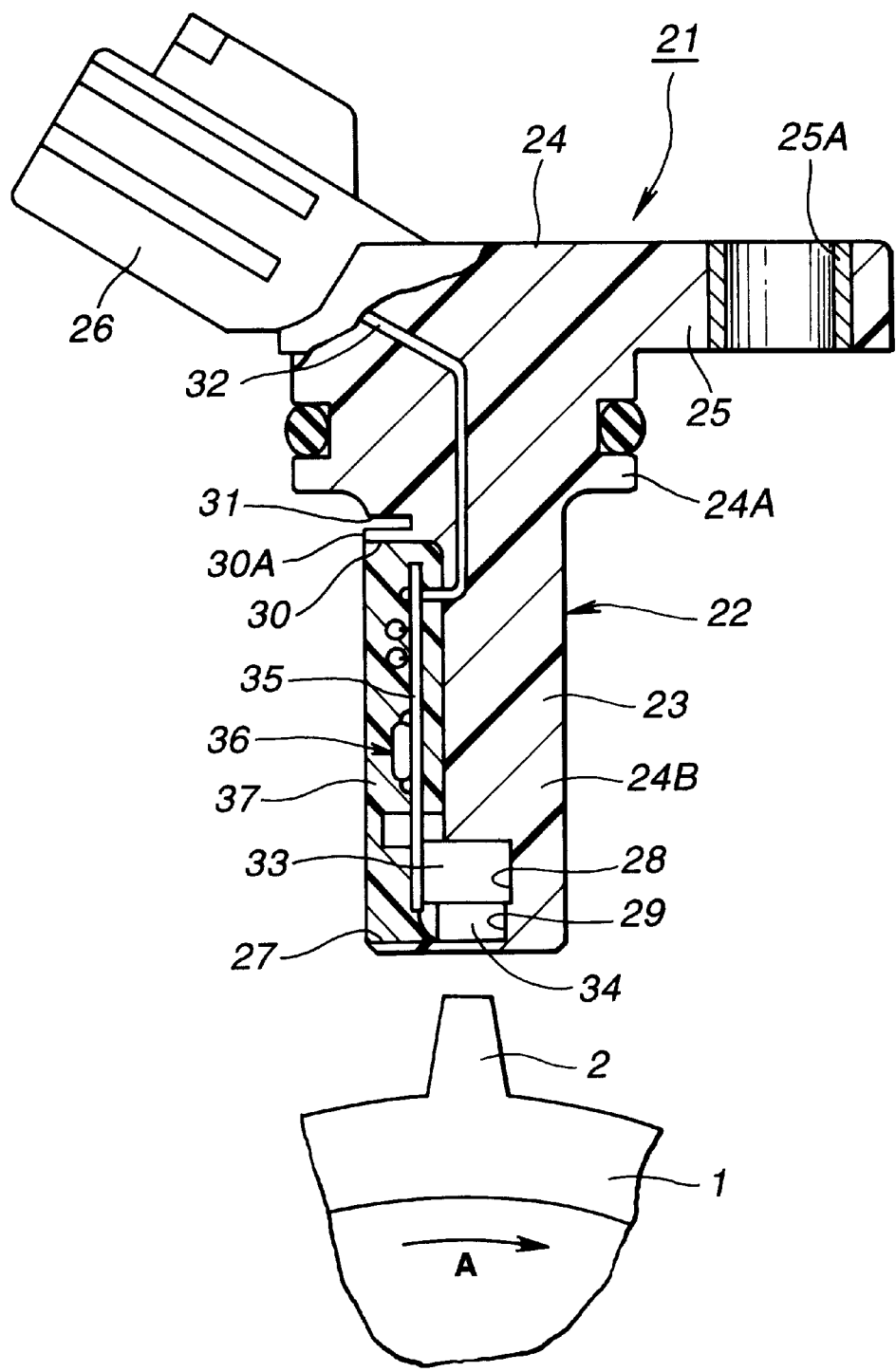
FIG. 1 is a vertical longitudinal sectional view which shows a rotation detecting apparatus of a first embodiment.
Figure 2:
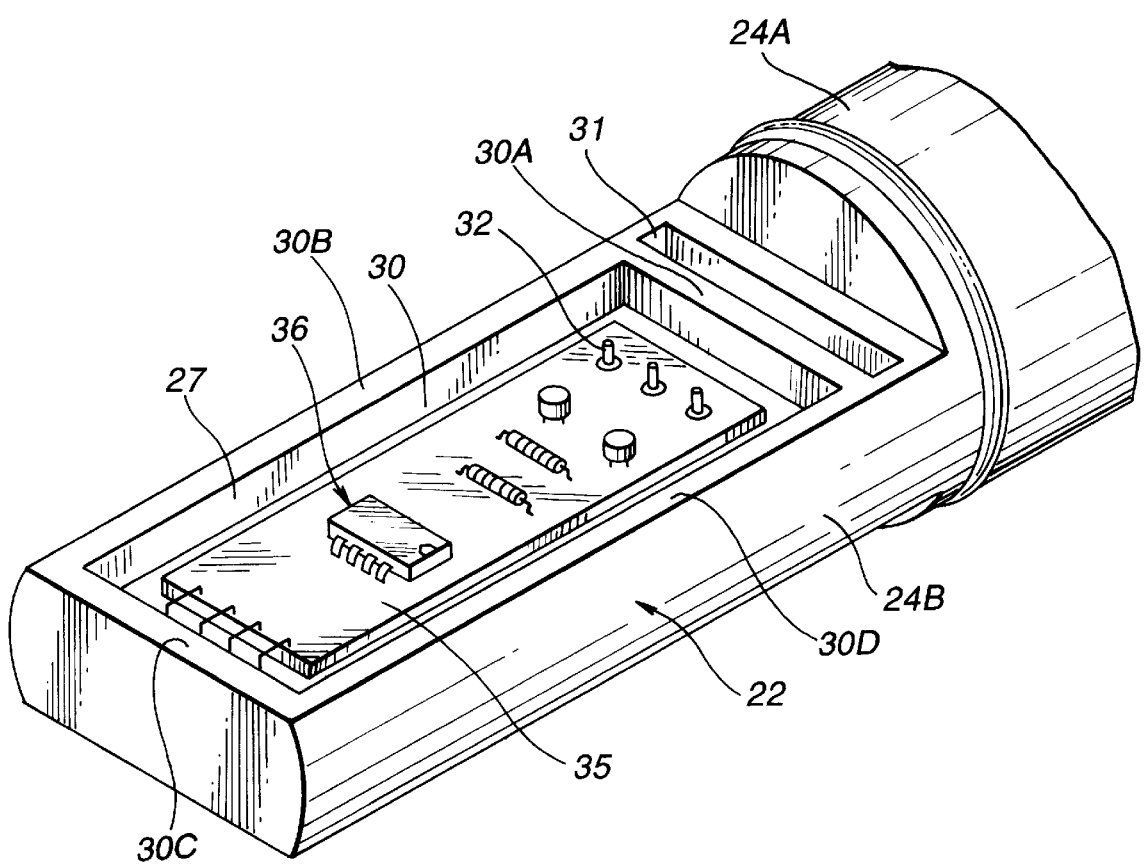
FIG. 2 is a perspective view showing a head portion of a casing body.

Referring to FIGS. 1 and 2, there is shown a first embodiment of a rotation detecting apparatus 21 according to the present invention.

The rotation detecting apparatus 21 comprises a casing 22 constituted by a casing body 23 and a sealing member 37. The casing body 23 comprises a stepped head portion 24, an installation bracket portion 25 and a connector portion 26 which are integrally formed or molded from insulating resin material. The stepped head portion 24 has a large-diameter inserting portion 24A and a prism portion 24B. The installation bracket portion 25 has an installation hole 25A through which the rotation detecting apparatus 21 is fixed to a non-rotation part of an engine. The connector portion 26 extends from a base end side of the head portion 24 toward an opposite direction to the installation bracket portion 25 obliquely.

Further, the inserting portion 24A of the head portion 24 is engaged with a non-rotation part of an engine and is fixed to the non-rotation part through the whole of the casing 22 and the installation bracket 25. A tip end portion of the prism portion 24B of the head portion 24 is formed into a bar-shape and extends toward the rotation plate 1. One of side surfaces of the prism portion 24B has a recess portion 27 having a rectangular opening.

The recess portion 27 comprises installation holes 28 and 29 and a circuit receiving portion 30. A magnet 33 and a Hall-effect device 34 are installed in the installation holes 28 and 29, respectively. The circuit receiving portion 30 has an opening area larger than those of the installation holes 28 and 29 and receives the circuit base plate 35 thereby. The circuit receiving portion 30 of the recess portion 27 is defined by four peripheral walls 30A, 30B, 30C and 30D.

A clearance groove portion 31 is formed at a portion connecting the upper peripheral wall 30A and the head portion 24, more particularly in the vicinity of the recess portion 27 and at a side to which the connector portion 26 is extendingly located as shown in FIGS. 1 and 2. The clearance groove 31 is a narrow groove and is parallel with the upper peripheral wall 30A of the circuit receiving portion 30. The clearance groove 31 functions to decrease the thickness of the upper wall 30A of the circuit receiving portion 30.

The rotation detecting apparatus 21 outputs a detection signal to external through a terminal 32 having first and second ends. The first end of the terminal 32 protrudes in the circuit receiving portion 30 and is connected to the later-mentioned signal processing circuit 36. The second end of the terminal 32 extends into the connector portion 26 and is embedded in the casing body 23.

The magnet 33 is a permanent magnet and is installed in the installation hole 28 of the casing body 23 so as to be located at a tip end portion of the head portion 24. The Hall-effect device 34 functioning as a magnetic detection element is installed in the installation hole 29 of the casing body 23 so as to be located at the tip end portion of the magnet 33. The Hall-effect device 34 detects that the magnetic flux density between the magnet 33 and the rotation plate 1 is changed by the rotation of the rotation plate 1.

The signal processing circuit 36 such as a waveform shaping circuit is formed on the circuit base plate 35 by means of installed electronic parts. One connecting end of the signal processing circuit 36 is connected to the Hall-effect device 34, and the other connecting end of the signal processing circuit 36 is connected to the terminal 32 through which it is connected to an external microcomputer (not shown).

The sealing member 37 is made of soft resin material which is softer than that of the casing body 23. The sealing member 33 seals the recess portion 27 so as to cover the circuit base plate 35, the magnet 33 and the Hall-effect device 34. Such sealing by the sealing member 37 is executed by filling the melted resin material in the recess portion 27 after the circuit base plate 35, the magnet 33 and the Hall-effect device 34 are installed in the recess portion 27.

The rotation detecting apparatus 21 detects the change of the magnetic flux density caused by the approach of the tooth portion 2 of the rotation plate 1 by means of the Hall-effect device 34. The rotation detecting apparatus 21 outputs a signal which is obtained by eliminating excessive component such as noise from the detect signal by means of the signal processing circuit 36.

Next, a production process of the rotation detecting apparatus 21 of the first embodiment will be discussed.

In a shaping step of the casing body 23, the head portion 24, the installation bracket portion 25, the connector portion 26 and the recess portion 27 are integrally formed (molded) from resin material. Before this shaping step, the terminal 32 is embedded in the connector portion 26 and the circuit receiving portion 30 of the recess portion 27.

Next, in an installation step of the magnet 33, the Hall-effect device 34 and the circuit base plate 35 to the casing body 23, the magnet 33 and the Hall-effect device 34 are first installed into the installation holes 28 and 29, and the circuit base plate 35 is then received in the circuit receiving portion 30. Thereafter, an end of the terminal 32 is inserted in a through-hole (not shown) of the circuit base plate 35 and is connected with the circuit base plate 35 by means of soldering in order to fix the circuit base plate 35 in the circuit receiving portion 30.

In a filling step of the sealing member 37 to the recess portion 27, the recess portion 27 is filled with the sealing member 37, by filling melted resin material of the sealing member 37 in the recess portion 27. Owing to this filling step, the magnet 33, the Hall-effect device 34 and the circuit base plate 35 are sealingly embedded between the casing body 23 and the sealing member 37 and are integrated with the casing 22.

Thus, the rotation detecting apparatus 21 of the first embodiment according to the present invention is arranged such that the casing 22 is constituted by the casing body 23 and the sealing member 37 and that the magnet 33, the Hall-effect device 34 and the circuit base plate 37 are embedded therebetween. Therefore, it is possible to reduce the number of parts thereof as compared with that of the convention apparatus and to form it into one-piece structure as a whole.

Since the rotation detecting apparatus 21 is arranged such that the magnet 33, the Hall-effect device 34 and the circuit base plate 35 are received in the recess portion 27 which is formed during the shaping step of the casing member 23 and that the recess portion 27 is filled with the sealing member 37, the assembly process of the rotation detecting apparatus 21 is simplified, and therefore the production cost thereof is reduced.

Further, since the recess portion 27 is sealingly filled with the sealing member 37, it is possible to firmly prevent rain water and muddy-water from invading the recess portion 27 from external. This improves the waterproof performance and improves the reliability of the rotation detecting apparatus 21.

On the other hand, when heat of the engine is transferred to the rotation detecting apparatus 21 and the casing 22 is expanded due to the this heat, the thermal expansion and thermal compression of the casing body 23 may become different from those of the sealing member 37. However, since the first embodiment according to the present invention is arranged to provide a clearance groove 31 extending parallel with the upper wall 30A of the circuit receiving portion 30 so as to thin the thickness of the upper wall 30A of the circuit receiving groove 30, the difference between the thermal deformations of the casing body 23 and the sealing member 37 is absorbed by the clearance groove 31. Therefore, by deforming the upper wall 30A of the circuit receiving portion 30 so as to follow with the thermal deformation of the sealing member 37, the sealing member 37 is prevented from separating from the upper wall 30A of the circuit receiving portion 30. This enables the reliability of the rotation detecting apparatus 21 to be heightened.

Although the first embodiment is arranged to form the clearance groove 31 in the vicinity of the upper wall 30A of the circuit receiving portion 30, it will be understood that the present invention is not limited to this and may be arranged such that the clearance groove 31 is formed to surround the circuit receiving groove 30.

Figure 3:
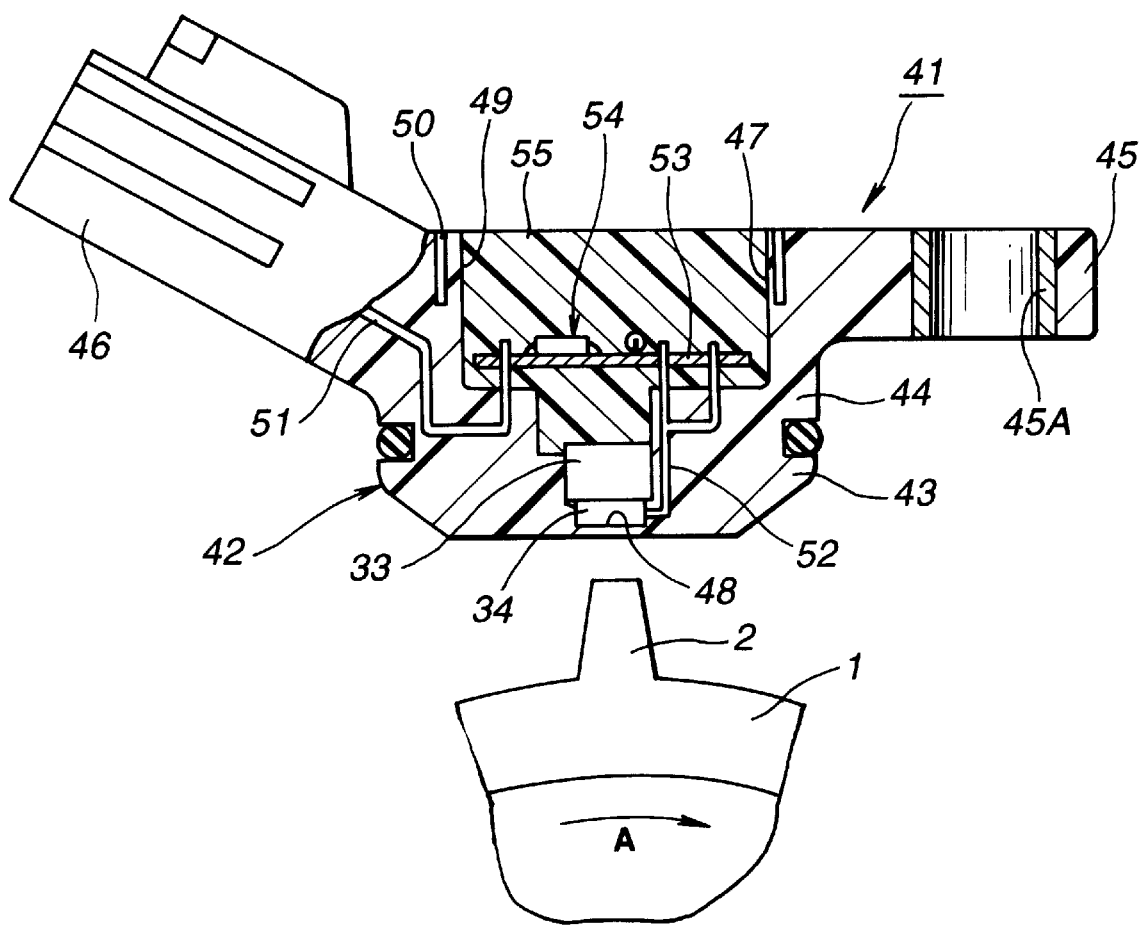
FIG. 3 is a longitudinal sectional view which shows a rotation detecting apparatus of a second embodiment.

Referring to FIG. 3, there is shown a second embodiment of a rotation detecting apparatus 41 according to the present invention.

The rotation detecting apparatus 41 of the second embodiment comprises an externally opening recess portion 47 at a head portion 44 while omitting the prism portion 24B of the head portion of the casing 22 of the first embodiment. In the second embodiment, elements as same as those of the first embodiment are designated by same reference numerals, and the explanation thereof is omitted herein.

The rotation detecting apparatus 41 of the second embodiment comprises a casing 42 constituted by a casing body 43 and a sealing member 55. The casing body 43 comprises a large-diameter head portion 44, an installation bracket portion 45 and a connector portion 46. The installation bracket portion 45 having an installation hole 45A is located at a base plate side of the head portion 44 and protrudes toward a diametrically outward direction. The connector portion 46 is located at an opposite position to the installation bracket portion 45 and extends upwardly and obliquely. The large diameter head portion 44, the installation bracket portion 45 and the connector portion 46 are integrally molded from isolating resin material.

Further, an outer peripheral portion of the head portion 44 is engaged with a non-rotation part of the engine, and the whole of the casing 42 is fixed to the non-rotation part through the installation bracket portion 45. The head portion 44 is formed into a bottomed cylinder, and an internal portion thereof has a recess portion 47.

Figure 4:
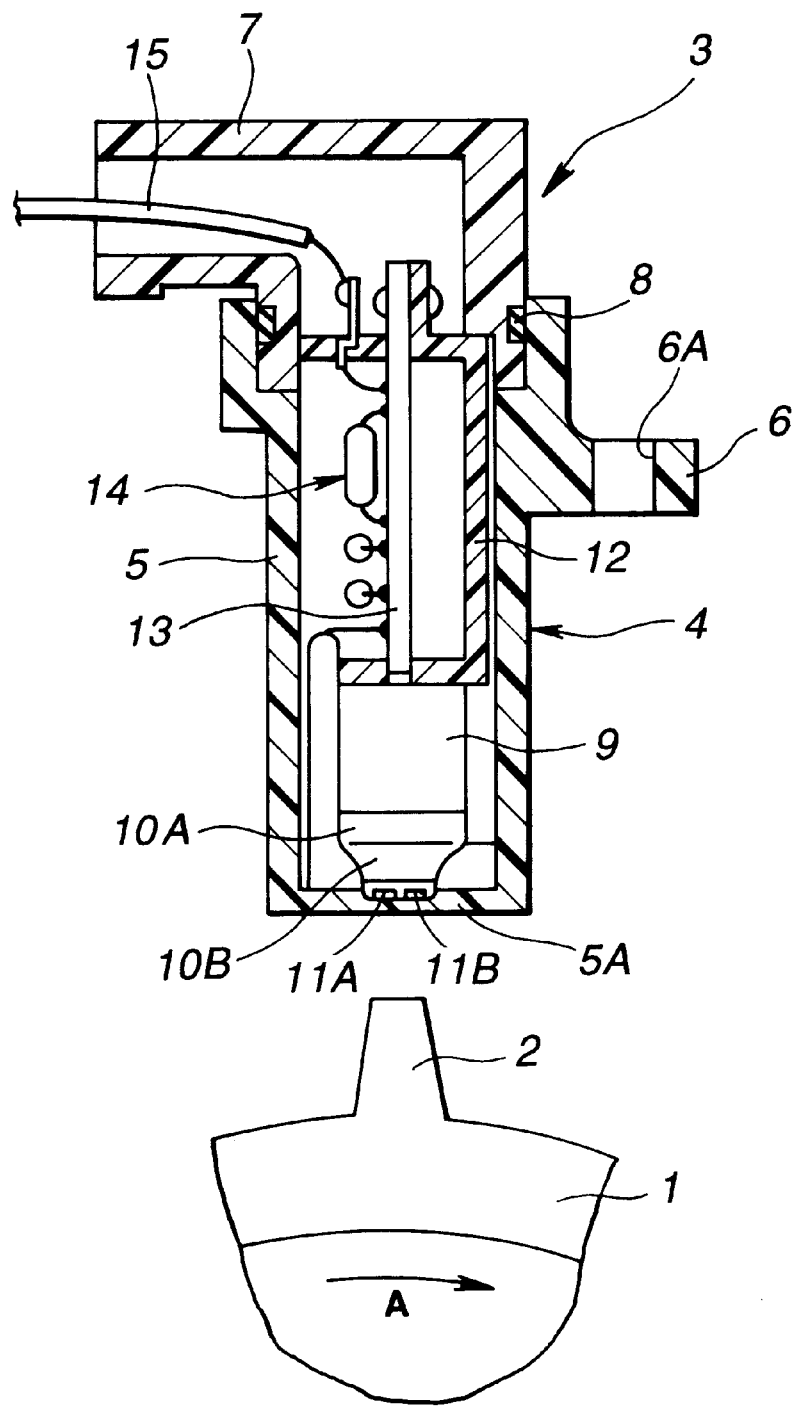
FIG. 4 is a longitudinal section view which shows a conventional rotation detecting apparatus.

The recess portion 47 is formed within the head portion 44. The recess portion 47 has a bottomed installation hole 48 and a circuit receiving portion 49. The magnet 33 and the Hall-effect device 34 are installed in the installation hole 49. The circuit receiving portion 49 is formed to have an opening area larger than that of the installation hole 48 and receives a circuit base plate 53. A clearance groove 51 is formed so as to surround a wall defining the recess portion 47 as shown in FIG. 4. The clearance groove 50 functions to decrease the thickness of the surrounding wall of the circuit receiving portion 49.

A detection signal of the rotation detecting apparatus 41 is outputted to external through a terminal 51 having first and second ends. The first end of the terminal 51 protrudes at the circuit receiving portion 49 and connected to the circuit base plate 53. The second end of the terminal 41 is embedded in the casing body 43 so as to extend to the connector portion 46.

A lead terminal 52 is connected to the Hall-effect device 34 and a signal processing circuit 54. The lead terminal 52 is embedded in the casing body 43 during the shaping step. Installed electronic parts on the circuit base plate 53 forms the signal processing circuit 54 such as a waveform shaping circuit. An electric connect end of the signal processing circuit 54 is connected to the Hall-effect device 34 through the lead terminal 52, and the other electric connect end thereof is connected to the terminal 51 to be connected with an external microcomputer (not shown).

The sealing member 55 is made of resin material which is softer than the material of the casing member 43. The sealing member 55 seals the recess portion 47 by filling it in the recess portion 47 after the circuit base plate 53, magnet 33 and the Hall-effect device 34 are embedded in the recess portion 47.

In addition to being arranged to ensure the functional advantages as is generally similar to those of the first embodiment, the second embodiment specially enables the head portion 44 of the casing body 43 to be produce small in size. Therefore, the rotation detecting apparatus 41 of the second embodiment can be formed compact.

As mentioned above in detail, since the casing 22(42) of the rotation detecting device 21(41) is constituted by the casing body 23(43) and the sealing member 37(55), and the magnet 33, the magnetic detection element 34 and the signal processing circuit 36(54) are embedded in the recess portion 27(47). Therefore, it is possible to directly receive the magnet 33, the magnetic detection element 34 and the signal processing circuit 36(54). This decreases the number of the parts and simplifies the assembly process. Further, the production cost thereof is decreased.

Further, the magnet 33 and the magnetic detection element 34 are installed in the hole in the recess portion 27(47), and the signal processing circuit 36(54) is received thereon and in the circuit receiving portion 30(49). Therefore, it is possible to easily carry out the assembly operation of the magnet 33, the magnetic detection element 34 and the signal processing circuit 36(54) in the recess portion 27(47) of the casing body 23(42) and improves the operational efficiency during the assembly operation.

Additionally, since the clearance groove 31(50) for absorbing the thermal expansion of the sealing member 37(55) is formed at the peripheral wall side of the recess portion 27(47), even if a difference between the thermal deformations of the casing body 23(42) and the sealing member 37(55) is generated, it is possible to absorb the difference by means of the clearance groove 31(50). This prevents the separation of the sealing member 37(55) so as to protect the inner parts such as the signal processing circuit 36(54) from external rain water, and improves the reliability of the of the rotation detecting device.

Furthermore, since the magnetic detection element is constituted by the Hall-effect device 34, it is possible to compactly receive the magnet 33 and the Hall-effect device 34 in the recess portion 27(47) of the casing body 23(43). This enables the whole of the device to be produced small in size and light in weight.

Although the preferred embodiments according to the present invention have been employed the Hall-effect device 34 as a magnetic detection element, the present invention is not limited to this and may be applied, for example, to the detection of rotation speeds of various rotation members of an electric motor.

While the preferred embodiments have been shown and described as to the case that the rotation detecting apparatus 21 (41) is applied to the detection of the rotation speed, the present invention may not be limited to this and may be applied to the detection of rotation speed of the various rotation members of the electric motor.

The contents of Application No. P9-185834, with a filing date Jun. 26, 1997 in Japan, are hereby incorporated by reference.

What is claimed is:

1. A rotation detecting apparatus comprising:
   a magnet;
   a magnet detection element located in the vicinity of said magnet, said magnetic detection element detecting change in a magnetic field of said magnet due to rotation of an adjacently-positioned rotation member;
   a signal processing circuit processing a signal from the magnetic detection element; and
   a casing made of resin material comprising a casing body and a sealing member, the casing body having a recess portion which receives said magnet, said magnet detection element and said signal processing circuit, the sealing member filling the recess portion so as to sealingly embed said magnet, said magnetic detection element and said signal processing circuit in the recess portion,
   wherein a clearance groove for absorbing thermal deformation of the sealing member is formed at a peripheral wall portion of the recess portion in the casing body.

2. A rotation detecting apparatus as claimed in claim 1, wherein the recess portion of the casing body comprises an installation hole to which said magnet and said magnetic detecting element are installed and the circuit receiving portion which has an opening area larger than that of the installation hole and which receives said signal processing circuit.

3. A rotation detecting apparatus as claimed in claim 1, wherein said magnetic detection element includes a Hall-effect device.

4. A rotation detecting apparatus as claimed in claim 1, wherein the casing body further comprises a connector portion through which the signal processed by said signal processing circuit is outputted.

5. A rotation detecting apparatus as claimed in claim 1, wherein the recess portion is formed at a side surface of a prism portion of the casing body and has a rectangular shape.

6. A rotation detecting apparatus as claimed in claim 1, wherein the clearance groove surrounds the recess portion.

7. A rotation detecting apparatus as claimed in claim 1, wherein the resin material of the sealing member is softer that that of the casing body.

8. A rotation detecting apparatus as claimed in claim 1, wherein the recess portion has four peripheral wall portions that completely surround the recess portion, and
   wherein one of the peripheral wall portions that is formed with the clearance groove has a smaller thickness than other three peripheral wall portions of the recess portion.

9. A rotation detecting apparatus as claimed in claim 1, wherein the recess portion has four peripheral wall portions that completely surround the recess portion, and
   wherein one of the peripheral wall portions that is formed with the clearance groove has a smaller thickness than other three peripheral wall portions of the recess portion.

10. A rotation detecting apparatus as claimed in claim 9, wherein the one of the peripheral wall portions that is formed with the clearance groove is disposed furthest away from the magnet and the rotation member.

11. A rotation detecting apparatus comprising:
   a casing made of resin material;
   a magnet installed in said casing;
   a magnetic detection element installed in said casing so as to be located in the vicinity of said magnet, said magnetic detection element detecting that change in a magnetic field of said magnet due to rotation of an adjacently-positioned rotation member; and
   a signal processing circuit processing a signal from the magnetic detection element;
   wherein said casing comprises:
      a casing body which has a recess portion for receiving said magnet, said magnetic detection element and said signal processing circuit,
      a sealing member which is formed of resin material that is disposed in a recess portion so as to embed said magnet, said magnetic detection element and said signal processing circuit in the recess portion, and
      a clearance groove that absorbs thermal deformation of the sealing member, the clearance groove being formed at a peripheral wall portion of the recess portion in the casing body,
      wherein the casing body is integrally formed with a connected portion connected to said signal processing circuit.

12. A rotation detecting apparatus as claimed in claim 11, wherein the recess portion has four peripheral wall portions that completely surround the recess portion, and
   wherein one of the peripheral wall portions that is formed with the clearance groove has a smaller thickness than other three peripheral wall portions of the recess portion.

13. A rotation detecting apparatus as claimed in claim 11, wherein resin material of the sealing member is softer than the resin material of the casing.

14. A rotation detecting apparatus comprising:

a rotation member connected to a rotation detected object;

a magnet disposed to having said rotation having a predetermined distance from said rotation member to form a magnetic field therebetween;

a magnetic detection element located adjacent to but separate from said magnet and between said magnet and said rotation member, said magnetic detection element detecting a change of the magnetic field changed by the rotation of said rotation member;

a signal processing circuit electrically connected to said magnetic detection element and processing a signal outputted from the magnetic detection element; and a casing comprising:

a recess portion in which said magnet, said magnet detection element and said signal processing circuit are disposed;

a sealing member that is disposed so as to fill the recess portion so as to sealingly embed said magnet, said magnet detection element and said signal processing circuit in the recess portion; and a clearance groove that absorbs thermal deformation of the sealing member, the clearance groove being formed at a peripheral wall portion of the recess portion in the casing body.

15. A rotation detecting apparatus as claimed in claim 14, wherein resin material of the sealing member is softer than the resin material of the casing.

* * * * *